(12) United States Patent
Manneschi

(10) Patent No.: US 11,512,932 B2
(45) Date of Patent: Nov. 29, 2022

(54) DUAL DETECTOR WITH TRANSVERSE COILS

(71) Applicant: Alessandro Manneschi, Arezzo (IT)

(72) Inventor: Alessandro Manneschi, Arezzo (IT)

(*) Notice: Subject to any disclaimer, the term of this patent is extended or adjusted under 35 U.S.C. 154(b) by 289 days.

(21) Appl. No.: 16/954,056

(22) PCT Filed: Dec. 14, 2018

(86) PCT No.: PCT/EP2018/085063
§ 371 (c)(1),
(2) Date: Jun. 15, 2020

(87) PCT Pub. No.: WO2019/115808
PCT Pub. Date: Jun. 20, 2019

(65) Prior Publication Data
US 2021/0080230 A1    Mar. 18, 2021

(30) Foreign Application Priority Data
Dec. 15, 2017 (FR) ...................... 1762285

(51) Int. Cl.
*F41H 11/136* (2011.01)
*G01S 13/86* (2006.01)
(Continued)

(52) U.S. Cl.
CPC ........ *F41H 11/136* (2013.01); *G01S 13/0209* (2013.01); *G01S 13/86* (2013.01);
(Continued)

(58) Field of Classification Search
CPC ...... F41H 11/136; G01S 13/86; G01S 13/885; G01S 13/89; G01S 13/0209; G01V 3/105;
(Continued)

(56) References Cited

U.S. PATENT DOCUMENTS

| 9,733,353 B1 | 8/2017 | Carlson et al. |
| 2006/0091888 A1 | 5/2006 | Holman et al. |

(Continued)

FOREIGN PATENT DOCUMENTS

EP    0607605 A1    7/1994

OTHER PUBLICATIONS

French Search Report including Written Opinion for FR1762285 dated Sep. 11, 2018; 12 pages.
International Search Report including Written Opinion for PCT/EP2018/085063 dated May 14, 2019; 19 pages.

*Primary Examiner* — Raul J Rios Russo
(74) *Attorney, Agent, or Firm* — Lerner, David, Littenberg, Krumholz & Mentlik, LLP

(57) ABSTRACT

The invention relates to a dual detector with a detection head (10), comprising:—a platform (11) and—an induction sensor fastened to the platform (11) and comprising a transmitter coil (12) and a receiver coil (13), the transmitter coil (12) and the receiver coil (13) each forming a loop, the loop of the transmitter coil (12) overlapping the loop of the receiver coil (13) at least partially so as to form a coupling zone (14), the coupling zone (14) being elongated in a first longitudinal direction defining a first axis ($X_1$), the handle (20) extending in a plan ($P_1$) normal to the platform (11) and the first axis ($X_1$) of the coupling zone (14) being transverse to this plane ($X_1$).

17 Claims, 4 Drawing Sheets

(51) Int. Cl.
*G01S 13/88* (2006.01)
*G01V 3/10* (2006.01)
*G01V 3/165* (2006.01)
*H04B 5/00* (2006.01)
*G01S 13/89* (2006.01)
*G01S 13/02* (2006.01)
*G01V 3/12* (2006.01)
*G01V 8/00* (2006.01)
*G01V 3/15* (2006.01)

(52) U.S. Cl.
CPC .......... *G01S 13/885* (2013.01); *G01S 13/89* (2013.01); *G01V 3/105* (2013.01); *G01V 3/165* (2013.01); *H04B 5/0081* (2013.01); *G01V 3/12* (2013.01); *G01V 3/15* (2013.01); *G01V 8/005* (2013.01)

(58) Field of Classification Search
CPC ............ G01V 3/165; G01V 3/16; G01V 3/10; G01V 3/12; G01V 8/005; G01V 3/15; H04B 5/0081; H04B 5/0075
See application file for complete search history.

(56) References Cited

U.S. PATENT DOCUMENTS

| | | | |
|---|---|---|---|
| 2008/0036644 A1 | 2/2008 | Skultety-Betz et al. | |
| 2011/0039142 A1* | 2/2011 | Kwag | H01M 10/6557 429/99 |
| 2012/0092206 A1* | 4/2012 | Etebari | G01V 3/101 29/601 |
| 2013/0113648 A1 | 5/2013 | Duvoisin, III et al. | |
| 2015/0185352 A1* | 7/2015 | Jayasuriya | G01V 3/10 89/1.13 |
| 2020/0393557 A1* | 12/2020 | Manneschi | G01V 3/12 |
| 2021/0080608 A1* | 3/2021 | Manneschi | G01V 3/105 |

* cited by examiner

DUAL DETECTOR WITH TRANSVERSE COILS

CROSS-REFERENCE TO RELATED APPLICATIONS

The present application is a national phase entry under 35 U.S.C § 371 of International Application No. PCT/EP2018/085063 filed Dec. 14, 2018, which claims priority from French Application No. 1762285 filed Dec. 15, 2017, all of which are hereby incorporated herein by reference.

FIELD OF THE INVENTION

The invention relates to the field of detecting target objects, and more particularly the detection of explosive charges such as land mines buried in the ground.

TECHNICAL BACKGROUND

In order to detect explosive charges, it is known to use dual technology detectors ("dual detectors") comprising a detection head housing an inductive sensor and a ground-penetrating radar, insofar as these technologies are complementary as regards the types of materials detected (metals for the inductive sensor vs. differences in dielectric constants of the materials and relative position for the radar).

In use, the Applicant has however noticed that the ground was not neutral from an electromagnetic point of view and can therefore disturb the coupling between the windings. In addition, the ground is rarely uniformly magnetic so that, during the scanning of the ground with the detector by an operator, the detected signal can vary only due to the presence of metal debris or to the very composition of the ground, or even trigger false alarms.

In addition, the operators using these detectors may be inadequately trained and may not hold the detector properly or perform an inappropriate scanning motion. The detection head can then form a lateral angle with the ground, so that one of the coils is closer to the ground than the other of the coils, which creates a strong modulation of the signal and therefore risks triggering false alarms. And even if the operator were well trained and tried to keep the detection head substantially parallel to the ground at any point in the scanning motion, he cannot locally modify its inclination to take into account the unevenness in the ground.

In order to overcome these difficulties, manufacturers tend to reduce the sensitivity of these detectors. The risk, however, is that it will no longer be able to detect targets buried in the ground and therefore put the lives of the operators in danger.

SUMMARY OF THE INVENTION

An object of the invention is therefore to propose a dual detector comprising a detection head housing an inductive sensor and another sensor, such as a ground-penetrating radar, which is capable of reducing false alarms likely to be generated during scanning of the ground with the detector with the detector while having higher sensitivity.

To this end, the invention proposes a dual detector comprising a detection head fastened to a handle by means of a mechanical link, the detection head including:
an enclosure including a cover, on which is attached the mechanical link, and a base opposite the cover and configured to face ground to be probed,
an inductive sensor, mounted fixedly in the enclosure,
a ground-penetrating radar, mounted fixedly in the enclosure.

The radar is positioned in the enclosure so as to extend between the inductive sensor and the base. Moreover, the inductive sensor comprises a distinct transmitting coil and receiving coil, each forming a loop, and in that the transmitting antenna is housed in the center of one of the transmitting coil and the receiving coil and the receiving antenna is housed in the center of the other of the transmitting coil and the receiving coil.

Certain preferred but non-limiting features of the dual detector described above are the following, taken individually or in combination:
a minimum distance between the radar and the base is less than or equal to one centimeter, preferably between about one millimeter and about five millimeters.
a maximum distance between the inductive sensor and the base is comprised between about 15 millimeters and about 30 millimeters.
the detector also comprises an impedance adapter connected to the radar.
the impedance adapter is housed in the enclosure, between the inductive sensor and the cover.
the transmitting coil and the receiving coil are distinct and not concentric.
at least one of the transmitting coil and the receiving coil has an elongated shape in a given direction, the transmitting antenna and the receiving antenna also having an elongated shape in said direction so as to maximize their radiating surface.
both the transmitting coil and the receiving coil have an elongated shape in the given direction.
the transmitting coil and the receiving coil are homopolar.
the transmitting coil and the receiving coil comprise wound wires, the transmitting coil having a greater number of turns than the receiving coil.
the transmitting coil and the receiving coil are printed directly on the platform, the platform then forming a printed circuit.
the radar comprises a transmitting antenna and a receiving antenna of one of the following types: quad ridged horn radio antenna, bow tie antenna, rectangular bow tie antenna, Archimedes spiral antenna, logarithmic spiral antenna, Vivaldi antenna, elongated logarithmic spiral antenna.
the transmitting antenna and the receiving antenna are made at least partially of nickel or of chromium.
a central portion of the transmitting antenna and of the receiving antenna is made of copper and comprises, on its surface, a protective layer made of gold.
the transmitting antenna and the receiving antenna have a thickness comprised between one hundred nanometers and one micron, for example equal to about 200 nm.

BRIEF DESCRIPTION OF THE DRAWINGS

Other features, aims and advantages of the present invention will appear more clearly upon reading the detailed description that follows, and with reference to the appended drawings, given by way of non-limiting examples and in which.

DETAILED DESCRIPTION OF ONE EMBODIMENT

Figure 1:
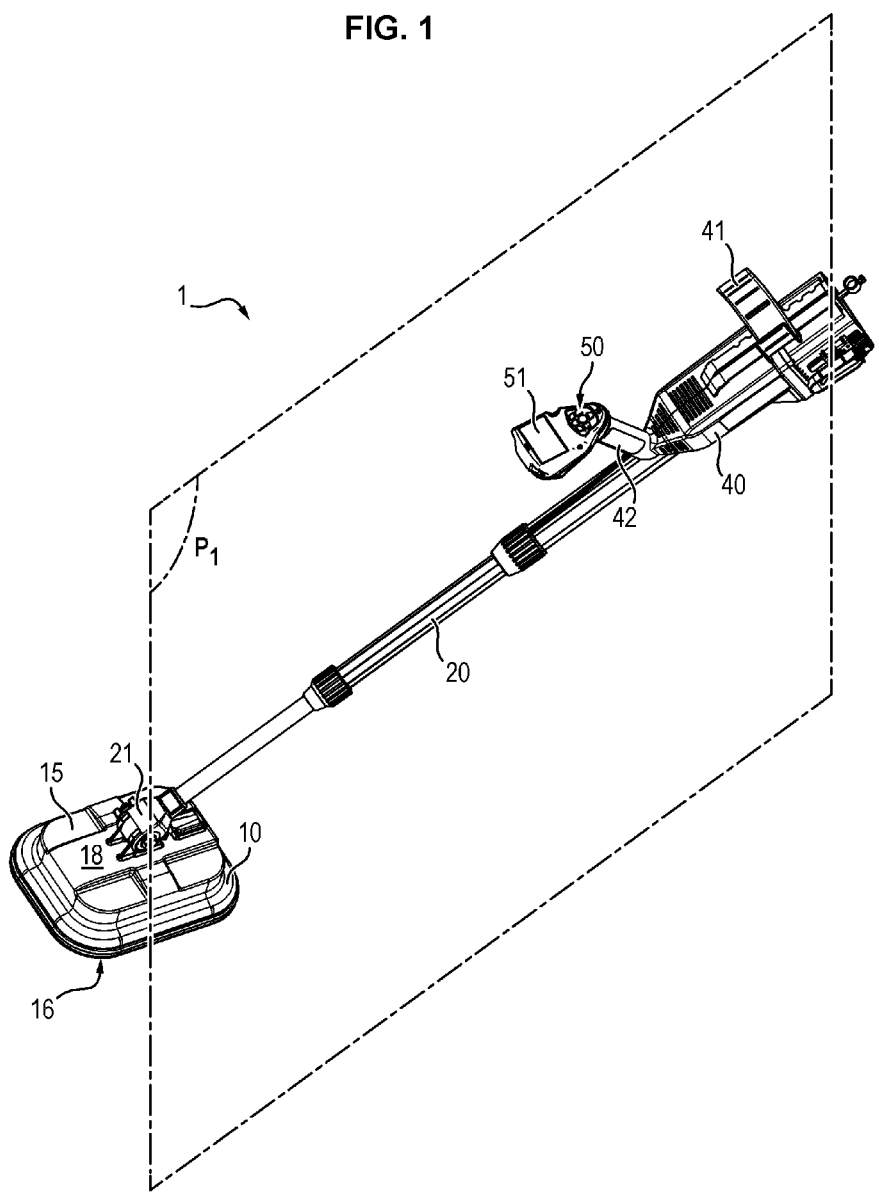
FIG. 1 is a perspective view of an exemplary embodiment of a detector conforming to the invention.

A dual detector 1 according to the invention comprises a detection head 10 fastened to a handle 20 by means of a mechanical link 21.

The detection head 10 corresponds to the part intended to come close to the ground in order to detect target products. To this end, it comprises:
- an enclosure 18 including a cover 15 on which is fastened the mechanical link and a base 16, opposite the cover 15 and configured to face the ground to be probed,
- an inductive sensor 12, 13, fixedly mounted in the enclosure 18, and
- a ground-penetrating radar 60, fixedly mounted in the enclosure 18.

What is meant here by "fixedly mounted" is that, under normal operating conditions, the inductive sensor 12, 13 and the radar 60 are immobile relative to the enclosure 18. The inductive sensor 12, 13 and the radar 60 can either be removed without being damaged, for example for maintenance operations, or on the contrary be fastened permanently in the enclosure 18.

The inductive sensor 12, 13 comprises either a single coil forming the transmitting and the receiving, or transmitting coil 12 and receiving coil 13, which are distinct from each other. Each of the transmitting coil 12 and the receiving coil then forms a loop. In one embodiment, the loop of the transmitting coil 12 and the loop of the receiving coil are formed in such a manner that the loop of the transmitting coil 12 at least partially overlaps the loop of the receiving coil 13 so as to form a coupling area 14. This configuration allows obtaining an inductive sensor in which the mutual induction is minimal.

By way of comparison, compared to an inductive sensor comprising a single coil constituting the transmitting and the receiving and formed of two loops in series of opposite directions in order to neutralize the effects of external interferences, the use of two distinct coils 12, 13 for the transmitting coil 12 and the receiving coil 13 makes it possible to amplify the signal, and therefore does not require decreasing the detection threshold to avoid the risks of false alarms.

In the following, the invention will be more particularly described in the case where the inductive sensor comprises a transmitting coil 12 and a receiving coil 13 distinct from each other. This is however not limiting, the invention also applying in the case of an inductive sensor comprising a single coil.

The transmitting coil 12 and the receiving coil 13 are homopolar coils. In a manner known per se, the transmitting coil 12 and the receiving coil 13 are configured to transmit and receive waves having a frequency comprised between 300 Hz and 180 kHz.

The ground-penetrating radar 60 comprises a transmitting antenna 61 and a receiving antenna 62 configured to transmit or receive electromagnetic waves in the ground, for example at a frequency comprised between 100 MHz and 8 GHz. When these waves encounter medium changes, part of the waves is returned to the surface and recorded by the receiving antenna 62.

In order to optimize coupling between the radar 60 and the ground, the radar 60 is positioned in the enclosure 18 so as to extend between the inductive sensor 12, 13 and the base 16. In fact, for the high frequencies of the electromagnetic waves transmitted and received by the radar (1 GHz and over), the corresponding wavelengths are on the order of ten centimeters or so, so that, overall, the troughs of the electromagnetic waves follow one another every two to five centimeters. Thus, by placing the radar 60 adjacent to the base 16, the radar 60 is located near the ground during scanning by an operator and therefore in the position in which its sensitivity is maximal.

In addition, by placing the inductive sensor 12, 13 at a distance from the base 16, the inductive sensor is kept away from the ground during scanning, which reduces its sensitivity to magnetic debris present on the ground or to magnetic ground. In fact, the target being larger than the debris, the signal of the target reduces more slowly when the inductive sensor 11, 12 is shifted. The ratio between the amplitude of the target signal and the amplitude of the debris signal is therefore improved.

Finally, this spatial configuration of the inductive sensor 12, 13 and of the radar 60 improves their decoupling and limits or even avoids risks of interference.

The respective position of the radar 60 and of the inductive sensor 12, 13 relative to the base 16 thus ensures optimal coupling and consequently increases the sensitivity of the detector 1.

Preferably, the radar 60 is placed as close as possible to the base 16, or even in contact with the base 16. For example, the radar 60 is positioned in the enclosure 18 so that the minimum distance d between the radar 60 and the base 16 is less than one centimeter, preferably between about one millimeter and about five millimeters (within 10%).

The transmitting antenna 61 and the receiving antenna are preferably positioned so as to extend parallel to the ground during detection. In fact, a spatial configuration of this type optimizes detection of changes in the medium by the radar 60. To this end, the transmitting antenna 61 and the receiving antenna 62 are preferably placed in the enclosure 18 so as to extend in a plane which is parallel to the base 16 of the enclosure 18. The shortest distance between the radar 60 and the base 16 of the enclosure 18 is therefore equal to the thickness of the air gap separating them.

The inductive sensor 12, 13 can be placed close to the cover 15, and in particular to the portion of the cover 15 which includes the mechanical link, in order to keep the inductive sensor 12, 13 away from the ground during the use of the detector 1. For example, the inductive sensor 12, 13 can be placed at a distance D of a few centimeters from the base 16, typically between about fifteen millimeters and about thirty millimeters (within 10%).

The circuits of the detector 1 having a high electrical resistance (i.e. on the order of fifty Ohms), the detector 1 also comprises an impedance adapter 30 connected to the transmitting 61 and receiving 62 antennas. Preferably, the impedance adapter 30 is connected to a central portion of each antenna 61, 62.

The impedance adapter 30 can in particular be housed in the enclosure 18, between the cover 15 and the inductive sensor 12, 13.

Figure 2:
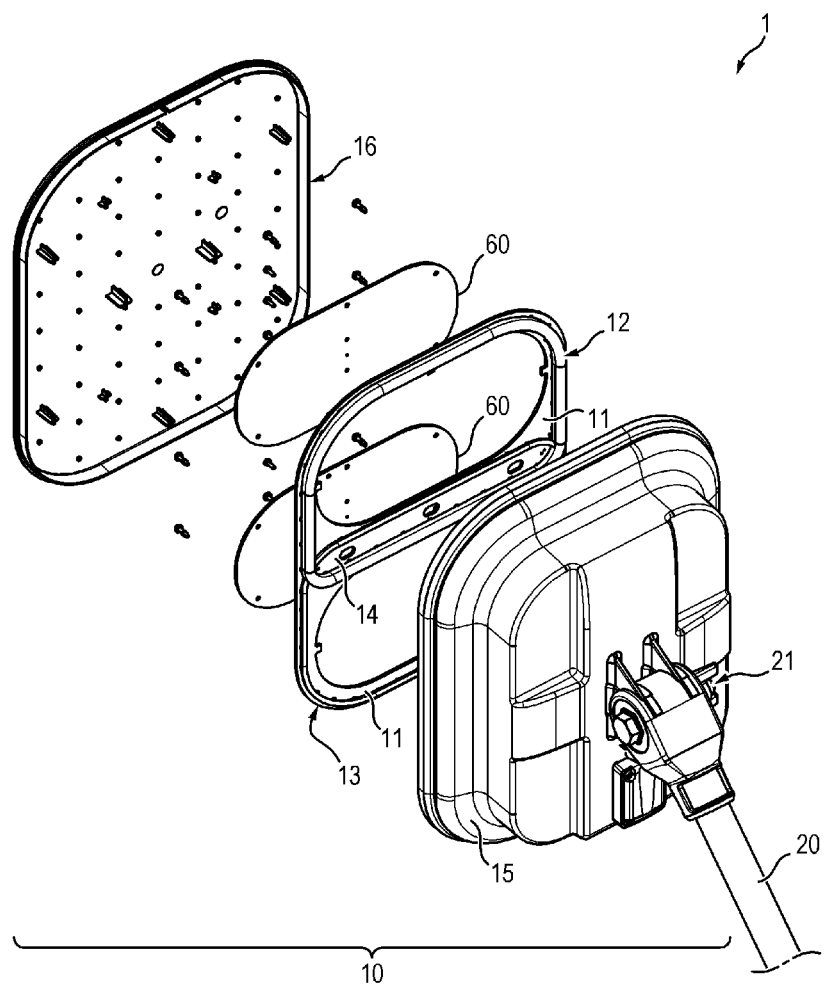
FIG. 2 is an exploded top perspective view of the detection head of the detector of FIG. 1.
Figure 3:
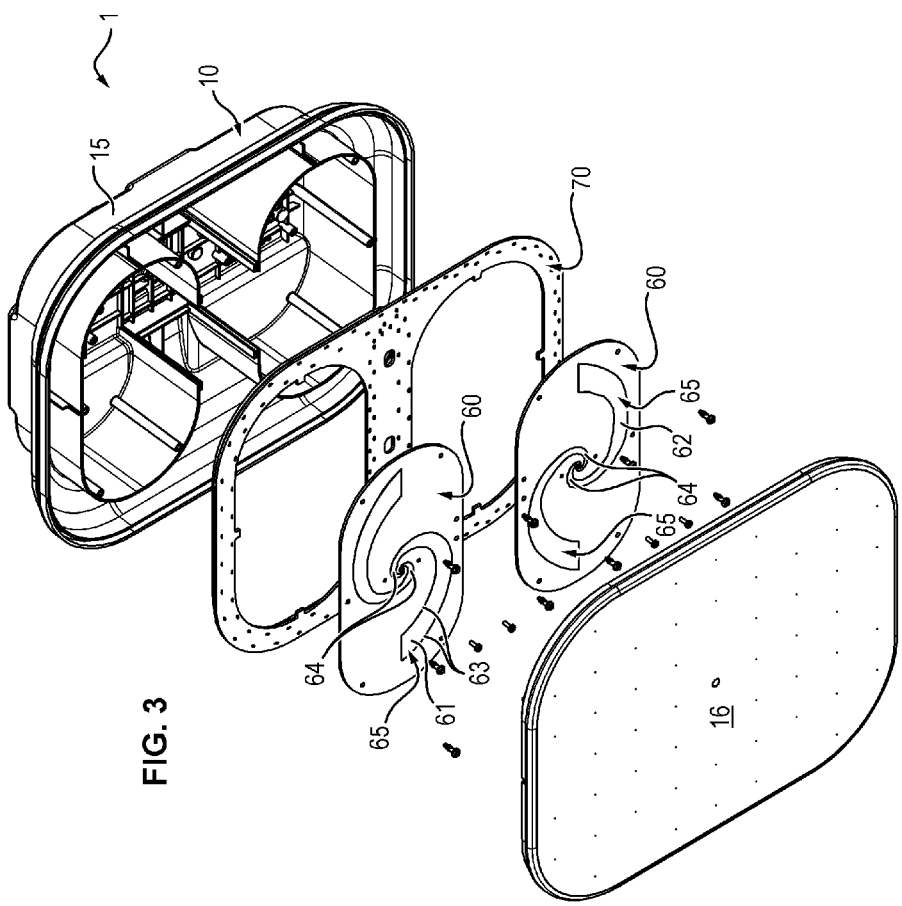
FIG. 3 is an exploded bottom perspective view of the detection head of the detector of FIG. 1.
Figure 4:
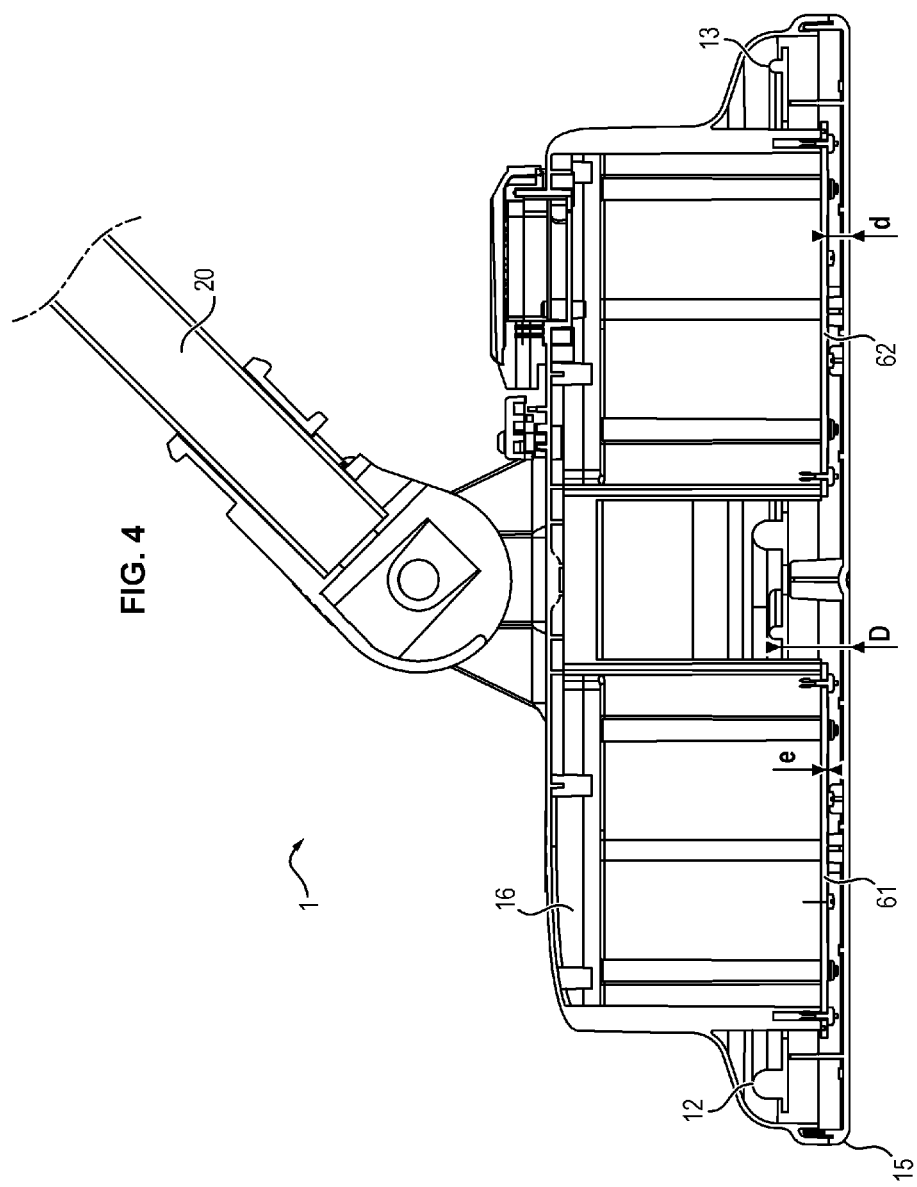
FIG. 4 is a section view along plane P1 of the detection head of the detector of FIG. 1.

In a first embodiment, the transmitting coil 12 and the receiving coil 13 are printed directly on the face of the platform 11. The platform 11 and the transmitting and receiving coils 12, 13 therefore form a printed circuit. This embodiment has the advantage of reducing the compactness of the inductive sensor in the detection head 10 as well as the overall weight of the detector 1. Its cost, however, is substantial. Consequently, in a second embodiment, which is illustrated in FIGS. 2 and 3, the transmitting coil 12 and the receiving coil 13 can comprise wound wires, the transmitting coil 12 having a greater number of turns than the receiving coil 13.

The mechanical link 21 can comprise a connection of the embedding, pivot or ball joint type. Preferably, as illustrated in the figures, the mechanical link 21 comprises a pivot.

Optionally, the detector 1 also comprises means 40 for gripping the detector 1 by an operator. Customarily, the gripping means 40 can comprise a hoop 41 configured for slidingly receiving the arm of the operator as well as a grip 42 configured to be seized by the operator.

The handle 20 can be telescopic and/or comprise several distinct portions configured to be assembled to one another before being fastened together, by screwing for example.

In a manner known per se, the detector 1 also comprises processing means 50 comprising in particular a microprocessor configured to process the signal detected by the inductive sensor 12, 13, such as one or several electronic board(s), a memory and if necessary alert means and/or a display device 51.

The processing means 50 can be housed entirely or partially in the gripping means 40.

The loops of the transmitting coil 12 and of the receiving coil 13 can have an elongated shape, i.e. they have a dimension in the plane of the platform 11 which is greater than another dimension. When the transmitting antenna 61 and the receiving antenna 62 are both housed in the center of one of the loops of the transmitting 12 and receiving 13 coils, respectively, the transmitting and receiving 12, 13 antennas 61, 62, also have an elongated shape along the greater dimension of the loops of the transmitting 12 and receiving 13 coils in order to maximize their radiation surface and therefore their transmission capacity. For example, the transmitting antenna 61 and the receiving antenna 62 can have the shape of a logarithmic spiral which has been lengthened in order to maximize the radiation surface and the gain of the antennas while minimizing the length of each strand 63 forming the spiral of the antennas 61, 62 so as not to increase the pulse. In an elongated logarithmic spiral antenna, the spacing between the strands 63 of the spiral is in fact greater and increases logarithmically. For example, the elongated logarithmic spiral forming the antennas 61, 62 can have a height of about 150 cm for 80 cm. As a variant, the transmitting antenna 61 and the receiving antenna 62 of the radar 60 can be of one of the following types: quad-ridged horn radio antenna, bow tie antenna, rectangular bow tie antenna, Archimedes spiral antenna, logarithmic spiral antenna, Vivaldi antenna.

In a manner known per se, the transmitting antenna 61 and the receiving antenna 62 can be made of copper, which is a good electrical conductor.

However, in order to reduce the risk of oxidation of the antennas, the transmitting and receiving 12, 13 antennas, 61, 62 can be partly made of nickel and/or of chromium and partly made of copper. In fact, nickel and chromium of not oxidizing over time while being electrically conductive.

For example, the center 64 of each antenna 61, 62 can be made of copper and protected by a layer comprising gold, while the rest 65 of the antennas 61, 62 is made of nickel and/or of chromium. The zone extending between the center 64 of each antenna 61, 62 and the rest of the antenna 61, 62 can be made of copper and covered with a layer of nickel (and/or of chromium).

Moreover, in order to limit interactions with the transmitting and receiving coils 12, 13, a thickness of the transmitting antenna 61 and of the receiving antenna 62 is less than the depth of absorption of the coils 12, 13. In this manner, the antennas 61, 62 become invisible to the magnetic field of the inductive sensor. In will be noted however that the thickness of the transmitting and receiving antennas 12, 13 must remain greater than a threshold thickness to guarantee sufficient robustness of the antennas 61, 62 and avoid any risk of breakage. The thickness of the transmitting and receiving antennas 61, 62 is therefore selected to be comprised between a hundred of nanometers and a micron. For example, the transmitting antenna 61 and the receiving antenna 62 can have a thickness of the order of 200 nm (within 10%).

In order to produce antennas 61, 62 with this thickness, it is possible in particular to use a physical vapor deposition (PVD) technique. This technique allows in fact obtaining antennas 61, 62 of very small thickness with a high dimensional accuracy, and producing several antennas at once.

The invention claimed is:

1. A dual detector comprising a detection head and a, the detection head including:
    an enclosure including a cover and a base, the cover being fixed to a mechanical link configured to connect the detection head to a handle, and the base (15) being opposite the cover and configured to face a ground to be probed,
    an inductive sensor comprising a transmitting coil and receiving coil which are distinct from each other, the transmitting coil and the receiving coil each forming a loop; and
    a ground-penetrating radar, comprising a transmitting antenna housed in a center of the loop of one of the transmitting coil and the receiving coil and a receiving antenna housed in a center of the loop of another of the transmitting coil and the receiving coil,
    wherein the inductive sensor and the ground-penetrating radar are fixedly mounted in the enclosure, the ground-penetrating radar being positioned in the enclosure so as to extend between the inductive sensor and the base.

2. The detector according to claim 1, wherein a minimum distance between the ground-penetrating radar and the base is less than or equal to one centimeter.

3. The detector according to claim 1, wherein a maximum distance between the inductive sensor and the base is comprised between about 15 millimeters and about 30 millimeters.

4. The detector according to claim 1, further comprising an impedance adapter connected to the ground-penetrating radar.

5. The detector according to claim 4, wherein the impedance adapter is housed in the enclosure, between the inductive sensor and the cover.

6. The detector according to claim 1, wherein the transmitting coil (12) and the receiving coil (13) are not concentric.

7. The detector according to claim 1, wherein at least one of the transmitting coil and the receiving coil has an elongated shape in a given direction, and wherein the transmitting antenna and the receiving antenna also have an elongated shape in the given direction so as to maximize their radiation surface.

8. The detector according to claim 1, wherein both the transmitting coil and the receiving coil have an elongated shape in the given direction.

9. The detector according to claim 1, wherein the transmitting coil and the receiving coil are homopolar.

10. The detector according to claim 1, wherein the transmitting coil and the receiving coil comprise wound wires, the transmitting coil having a greater number of turns of wound wires than the receiving coil.

11. The detector according to claim 1, wherein the inductive sensor further comprises a platform, the transmitting coil and the receiving coil (13) are printed directly on the platform (11), the platform (11) then forming a printed circuit.

12. The detector according to claim 1, wherein the transmitting antenna and the receiving antenna are of one of the following types: quad-ridged horn radio antenna, bow tie antenna, rectangular bow tie antenna, Archimedes spiral antenna, logarithmic spiral antenna, Vivaldi antenna, elongated logarithmic spiral antenna.

13. The detector according to claim 10, wherein the transmitting antenna and the receiving antenna are made at least partially of nickel or of chromium.

14. The detector according to claim 13, wherein a central portion of the transmitting antenna and of the receiving antenna is made of copper and comprises, on a surface, a protective layer made of gold.

15. The detectors according to claim 1, wherein the transmitting antenna and the receiving antenna have a thickness comprised between one hundred nanometers and one micron.

16. The detector according to claim 1, wherein a minimum distance between the ground-penetrating radar and the base is between about one millimeter and about five millimeters.

17. The detector according to claim 1, wherein the transmitting antenna and the receiving antenna have a thickness equal to about 200 nm.

* * * * *